US011949256B1

(12) United States Patent
Liu et al.

(10) Patent No.: US 11,949,256 B1
(45) Date of Patent: Apr. 2, 2024

(54) WIRELESS POLLING FREQUENCY ALTERATION

(71) Applicant: Hewlett-Packard Development Company, L.P., Spring, TX (US)

(72) Inventors: Kuo-Hsien Liu, Taipei (TW); Jerome Bove, Taipei (TW); Isaac Lagnado, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/968,091

(22) Filed: Oct. 18, 2022

(51) Int. Cl.
*H02J 50/90* (2016.01)
*H02J 50/12* (2016.01)

(52) U.S. Cl.
CPC .............. *H02J 50/90* (2016.02); *H02J 50/12* (2016.02)

(58) Field of Classification Search
None
See application file for complete search history.

(56) References Cited

U.S. PATENT DOCUMENTS

| | | | |
|---|---|---|---|
| 9,356,659 B2 | 5/2016 | Partovi | |
| 10,886,793 B2 * | 1/2021 | Lee | H02J 50/90 |
| 11,381,121 B2 * | 7/2022 | Jung | H02J 50/90 |
| 2005/0032474 A1 * | 2/2005 | Gordon | H04B 5/02 |
| | | | 455/41.1 |
| 2011/0128222 A1 * | 6/2011 | Hirota | H04W 88/06 |
| | | | 345/158 |
| 2013/0099735 A1 | 4/2013 | Partovi | |
| 2014/0184148 A1 * | 7/2014 | Van Der Lee | H02J 50/10 |
| | | | 320/108 |
| 2015/0214752 A1 * | 7/2015 | Gluzman | H02J 50/12 |
| | | | 307/104 |
| 2016/0254705 A1 * | 9/2016 | Jung | H02J 50/12 |
| | | | 307/104 |
| 2017/0018977 A1 * | 1/2017 | Van Wageningen | H02J 50/60 |
| 2017/0098965 A1 * | 4/2017 | Kikuchi | H02J 50/12 |
| 2017/0338685 A1 * | 11/2017 | Jung | H02J 50/90 |
| 2019/0393731 A1 * | 12/2019 | Maniktala | H02J 50/20 |
| 2021/0152034 A1 * | 5/2021 | Goodchild | H02J 50/90 |

FOREIGN PATENT DOCUMENTS

WO 2021/102177 A1 5/2021

OTHER PUBLICATIONS

"Low-Power Wireless Charger Transmitter Design Using MC56F8006 DSC," NXP, retrieved at https://www.nxp.com/files-static/microcontrollers/doc/app_note/AN4705.pdf, Mar. 2013, pp. 25.

* cited by examiner

*Primary Examiner* — Daniel Kessie
(74) *Attorney, Agent, or Firm* — Quarles & Brady LLP (57) ABSTRACT

Examples herein relate to wireless polling frequency alteration. For instance, in some examples a wireless power transmitter circuit can emit wireless signals to detect a presence of a wireless power receiver circuit included in a mobile device and a controller can alter a wireless polling frequency at which the wireless power transmitter circuit emits the wireless signals to a respective wireless polling frequency of a plurality of wireless polling frequencies.

15 Claims, 5 Drawing Sheets

WIRELESS POLLING FREQUENCY ALTERATION

BACKGROUND

Mobile devices such as mobile phones, wearable computing devices, tablets, laptop computers, monitors, etc. may include a rechargeable battery for powering the mobile devices. The rechargeable battery may be charged wirelessly, for instance, through electromagnetic induction.

Some computing devices such as laptops, desktops, etc. include circuitry to permit wireless charging of mobile devices. For instance, the computing devices may emit wireless signals (pings) to detect the presence of a mobile device and thereby permit wirelessly coupling to and wireless charging of the mobile device.

DETAILED DESCRIPTION

Some computing devices may include a wireless power transmitter circuit. The wireless power transmitter circuit can permit mobile devices to charge internal batteries in the mobile devices without the use of a physical charging connection such as a cable. For instance, a wireless power transmitter circuit in a computing device may use a "ping" or "digital ping" to determine when a mobile device is proximate to the computing device and thereby permit wirelessly coupling to and charging of the mobile device.

For example, a wireless power transmitter circuit (TX) can include a transmitter coil with an inductance (L) and a resonant capacitor with a capacitance (C) that is coupled to the transmitting coil to form a resonant LC circuit. A ping may be produced by delivering power to the resonant LC circuit. A mobile device can receive and respond to the ping. The response from the mobile device may be provided in a signal encoded using Amplitude Shift Key (ASK) modulation, among other possibilities. Upon receipt of the response, the computing device can initiate wireless charging of the mobile device.

However, ping emission can dissipate energy such as battery power of a computing device. For instance, 60 millijoules (mJ), 70 mJ, or 80 mJ of energy can be dissipated per ping. Some approaches may utilize a uniform wireless polling frequency (e.g., a fixed wireless polling frequency at 2 hertz (Hz) intervals). Consequently, such approaches may unnecessarily dissipate a large amount of energy from a computing device, particularly when a mobile device/user is not proximate to a computing device. Moreover, such approaches may dissipate a sufficient amount of energy such that the computing device ceases to permit wireless charging (e.g., to ensure other operations of the computing device function as intended). For instance, such approaches may result in a computing device ceasing to permit wireless charging (e.g., pinging) when a computing device is in a given off state (e.g., a S5 off state).

Accordingly, approaches herein provide for wireless polling frequency alteration. Wireless polling frequency alteration refers to a variance of a quantity of wireless pings per a given amount of time that are emitted by computing device. For instance, wireless polling frequency can be reduced (e.g., relative to other approaches that employ a uniform wireless polling frequency). Wireless polling frequency reduction can in turn reduce a power dissipation rate and/or permit a computing device employing wireless polling frequency alteration to wirelessly charge a mobile device even in a S5 off state. Additionally, when a proximity sensor indicates an object is absent, wireless polling frequency can be further reduced to in turn further reduce a rate of power dissipation, as described herein.

Wireless polling frequency can be altered (e.g., reduced) based on a current (real-time) state of a computing device such as an off state, a type of supplied power, and/or based on whether an object is proximate to the computing device, or any combination thereof, as described herein. For instance, wireless polling frequency can be varied based on a current off state of the computing device. When the computing device is in a given off state (e.g., a S5 off state) the wireless polling frequency can be reduced compared to when the computing device is in a higher (e.g., S0, S1, S2, S3, or modern standby) state, as described herein.

Figure 1:
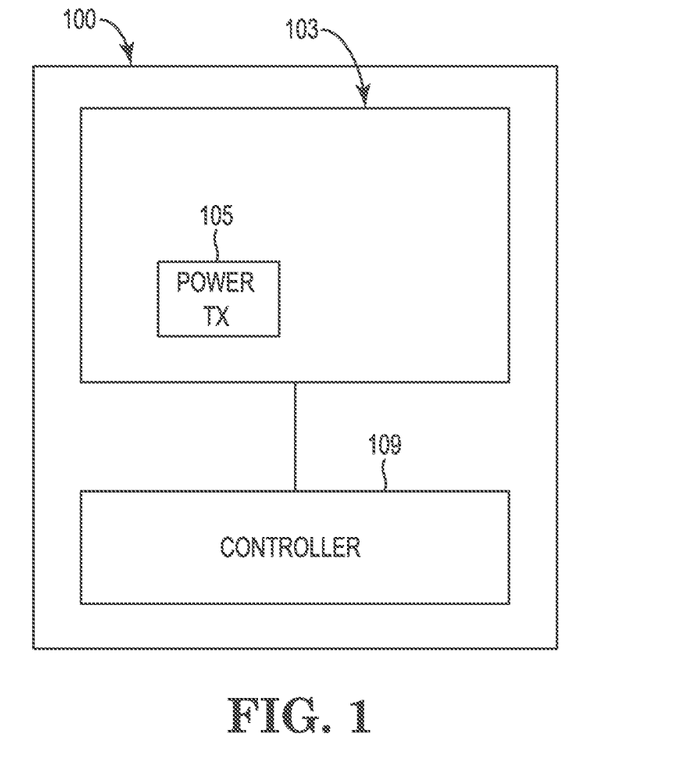
FIG. 1 is a diagram of an example of a computing device suitable for wireless polling frequency alteration.

FIG. 1 is a diagram of an example of a computing device 100 suitable for wireless polling frequency alteration. The computing device 100 can be a mobile phone, a wearable computing device, a tablet, a laptop computer, a desktop computer, a display or monitor, or combinations thereof, among other types in computing devices. The computing device 100 can be an all-in-one (AIO) computing device, as described herein.

The computing device 100 can include wireless power circuitry 103 and a controller 109. The wireless power circuitry 103 refers to circuitry to permit wireless charging of a mobile device. For instance, the wireless power circuitry 103 can include a wireless power transmitter (POWER TX) circuit 105. As used herein the wireless power transmitter circuit 105 refers to circuitry capable of emitting wireless power. The wireless power transmitter circuit 105 can emit wireless power to charge a corresponding wireless power receiver circuit in a mobile device that is in contact with or proximate to the computing device 100. For example, the wireless power transmitter circuit 105 can include a transmitter coil/circuit (e.g., an inductive coil) that can emit wireless power to charge a battery in a mobile device via a wireless power receiver circuit in the mobile device, as described herein.

The wireless power transmitter circuit 105 can emit wireless pings at a given wireless polling frequency, as described herein. The wireless pings can be passive wireless pings and/or active wireless pings. For example, a passive ping may use the voltage and/or current measured or observed at a resonant LC circuit, as described herein, to identify the presence of a receiving coil included in a mobile device that is proximate to the computing device 100. An active ping or digital ping can be transmitted in accordance with a protocol or standard. For instance, an active ping can be transmitted from wireless power transmission circuit 105 with a power level sufficient to cause coupling of electromagnetic flux with a nearby wireless power receiver circuit in another device. In either case, emission of the pings can permit the computing device 100 to detect the presence of a mobile device and thereby permit wireless charging of the mobile device.

The controller 109 can include a memory resource and a processing resource (e.g., processor). In some examples, the memory resource can be communicatively coupled to a processor, among other components such as the wireless power circuitry 103. For instance, a processor can be coupled to the memory resource to execute non-transitory instructions stored on the memory resource. For example, the memory resource can be communicatively coupled to the processor through a communication path. In some examples, a communication path can include a wired or wireless connection that can allow communication between devices and/or components within an individual device.

The memory resource may be electronic, magnetic, optical, or other physical storage device that stores executable instructions. Thus, a non-transitory machine readable medium (MRM) (e.g., a memory resource) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine readable medium (e.g., a memory resource) may be disposed within a controller 109 and/or the computing device 100. In this example, the executable instructions can be "installed" on the computing device 100.

Additionally, and/or alternatively, the non-transitory machine readable medium (e.g., a memory resource) can be a portable, external or remote storage medium, for example, which allows a computing device to download the instructions from the portable/external/remote storage medium. In this situation, the executable instructions may be part of an "installation package". As described herein, the non-transitory machine readable medium (e.g., a memory resource) can be encoded with executable instructions. The executable instructions, can be executed by the processor to perform various aspects (e.g., detect a presence of a wireless power receiver circuit, alter a wireless polling frequency, etc., described herein.

The controller 109 can cause the computing device 100 to emit wireless signals at a respective wireless polling frequency of a plurality of wireless polling frequencies. For instance, the controller 109 can cause the wireless power transmission circuit 105 to emit wireless signals to detect a presence of a mobile device at a respective wireless polling frequency of a plurality of wireless polling frequencies. Thus, unlike other approaches such as those which employ a uniform wireless polling frequency (e.g., a fixed system wireless polling frequency at 2 Hz intervals), the controller 109 can alter the wireless polling frequency based on an off state of the apparatus, a type of supplied power to the apparatus, detection of an object (e.g., a user and/or a mobile device), or any combination thereof, as described herein.

For instance, the plurality of wireless polling frequencies can include a system wireless polling frequency, a first wireless polling frequency, and a second wireless polling frequency, among other possibilities. The first wireless polling frequency can be less than the system wireless polling frequency and the second wireless polling frequency can be less than the first wireless polling frequency. The second wireless polling frequency can be less than both the system wireless polling frequency and the first wireless polling frequency. In some examples, the system wireless polling frequency can be employed when the computing device 100 is in a S0 on state and is receiving A/C, and may not be otherwise employed as described herein.

As mentioned, the controller 109 can vary the wireless polling frequency to a respective wireless polling frequency of a plurality of wireless polling frequencies. Information indicative of the plurality of wireless polling frequencies can be stored in a data structure such as a look-up table that includes information indicative of the polling frequencies and system states and/or power managements states associated therewith. For instance, as illustrated in Table 1 below, different power management states can be associated with different types of supplied power to the computing device 100 and/or different system states (e.g., on/off states) of a computing device. That is, in some examples the controller 109 can alter a wireless polling frequency based on whether the computing device 100 (e.g., an apparatus) is supplied with alternating current (A/C) or direct current (D/C) and/or based on a respective system state (off state) of the computing device 100.

For instance, for a given system state (e.g., a given off state) the controller 109 can decrease a wireless polling frequency when the computing device 100 is supplied with D/C, as compared to when the computing device 100 is supplied with A/C in the same system state. Conversely, for a given system state the controller 109 can increase a wireless polling frequency when the computing device 100 is supplied with A/C, as compared to when the computing device 100 is supplied with D/C in the same system state. Such alteration of the wireless polling frequency based on the type of power the computing device 100 is supplied with can balance wireless power transfer time (e.g., reduce an amount of time to ping and wirelessly couple the computing device 100 to a mobile device to permit wireless power transfer from the computing device 100 to the mobile device) and yet can reduce an amount of power utilized (e.g., an amount of power dissipated from a battery of the computing device 100) to permit wireless power transfer even when the computing device 100 is in a S5 off state.

For instance, a first power management state (ACTIVE MODE) can be associated with an AC power supply type (e.g., the computing device is supplied with A/C) and a S0 on state. Similarly, a second power management state (REDUCED MODE) can be associated with an A/C power supply type and a S3 or modem standby (MS) off state and third power management state (SLEEP MODE) can be associated with an A/C power supply type and a S4 or S5 off state, as illustrated in Table 1.

A fourth power management state (REDUCED MODE) can be associated with an D/C power supply type and a S0 on state, a fifth power management state (SLEEP MODE) can be associated with an D/C power supply type and a S3 or modem standby off state, a sixth power management state (DEEP SLEEP MODE) can be associated with an A/C power supply type and a S4 off state, S5 off state, as illustrated in Table 1. The sixth power management state (DEEP SLEEP MODE) can also be associated with a D/C power type and an additional battery state (e.g., when the battery is in a low power state). Other types of power management states are possible.

TABLE 1

| SYSTEM STATE | POWER MANAGEMENT STATE |
|---|---|
| AC POWER (S0) | ACTIVE MODE |
| AC POWER (MS) | REDUCED MODE |
| AC POWER (S4/S5) | SLEEP MODE |
| DC POWER (S0) | REDUCED MODE |
| DC POWER (MS) | SLEEP MODE |

TABLE 1-continued

| SYSTEM STATE | POWER MANAGEMENT STATE |
|---|---|
| DC POWER (S4/5) | DEEP SLEEP MODE |
| DC POWER (LOW BATTERY) | DEEP SLEEP MODE |

Table 2 illustrates an example of different wireless polling frequencies and corresponding power management states. Notably, unlike other approaches that employ a uniform wireless polling frequency and/or disable wireless polling/charging in a S4 and/or S5 off state, approaches herein do not employ a DISABLED MODE (e.g., in which the wireless polling frequency is 0 Hertz (Hz)) when in a S4 or S5 off state). Thus, approaches herein permit wireless polling and wireless charging in a S4 off state and a S5 off state. That is, approaches herein can reduce wireless polling frequency (e.g., when in a S4 off state and/or a S5 off state) to ensure that the capability of wirelessly charging a mobile device remains even when the computing device 100 is in a S4 or S5 off state.

TABLE 2

| POWER MANAGEMENT STATE | WIRELESS POLLING FREQUENCY | STANDBY CURRENT | PRIORITY # |
|---|---|---|---|
| DISABLED MODE | 0 Hz | 0 mA | N/A |
| DEEP SLEEP MODE | (0.05) × X Hz | 0.65 mA | 1 |
| SLEEP MODE | (0.25) × X Hz | 3.15 mA | 2 |
| REDUCED MODE | (0.5) × X Hz | 6.25 mA | 3 |
| ACTIVE MODE | X Hz | 12.5 mA | 4 |

Where "X" denotes a given quantity.

For instance, the controller 109 can alter the wireless polling frequency at which the wireless power transmitter circuit 105 emits the wireless signals (pings) to a first wireless polling frequency based on a type of power supplied to the computing device 100 and/or a system state of the computing device. While described in some instances as a first wireless polling frequency and a second wireless polling frequency, any quantity of wireless polling frequencies can be employed. For instance, in reference to Table 2, the wireless polling frequencies can include more than two wireless polling frequencies such as those corresponding to 2 Hz, 1 Hz, 0.5 Hz, and 0.1 Hz. Thus, each wireless polling frequency of the plurality of polling frequencies can be a different respective wireless polling frequency, unlike other approaches that employ a uniform wireless polling frequency regardless of a system state and/or power management state of a computing device. Further, it is noted the different wireless polling frequencies are not intended to correspond to a fixed particular individual wireless polling frequency but instead refer to any one of various wireless polling frequencies that are less frequent than a uniform system polling frequency employed by some approaches. For instance, the first wireless polling frequency can be equal to 1 Hz and the second wireless polling frequency can be equal to 0.5 Hz or 0.1 Hz, among other possible values.

In some examples, the controller 109 can alter the wireless polling frequency to a first wireless polling frequency of the plurality of polling frequencies when the computing device is in a S0, S1, S2, S3 or modem standby state. Additionally, in some examples, controller 109 can alter the wireless polling frequency to a second wireless polling frequency of the plurality of polling frequencies when the computing device is in a S4 or S5 off state. For instance, the controller 109 can alter the wireless polling frequency to a second wireless polling frequency when the computing device 100 is in a S5 off state and is receiving D/C power (e.g., in an absence of A/C power). Altering the wireless polling frequency to a second wireless polling frequency when the computing device 100 is in a S5 off state and is receiving D/C power can ensure that the computing device 100 retains sufficient power (e.g., battery power) to permit wireless charging of a mobile device even in a S5 off state.

Figure 2:
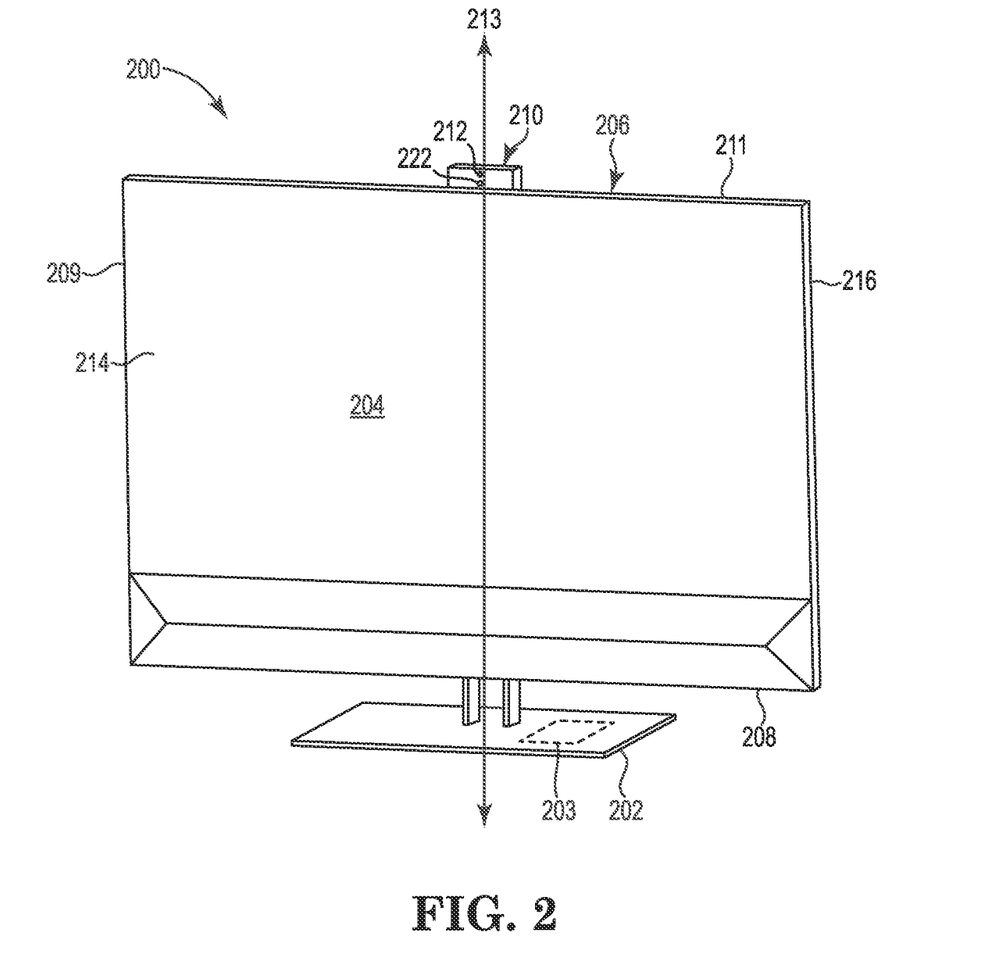
FIG. 2 is a front view of an example of a computing device suitable for wireless polling frequency alteration.

FIG. 2 is a view of an example computing device 200 suitable for wireless polling frequency alteration. As illustrated in FIG. 2, the computing device 200 can be an all-in-one (AIO) computing device. As used herein, an AIO computing device refers to a computer which integrates the internal components into the same housing as the display and can offer a touch input functionality of the tablet devices while also providing a processing power and a viewing area of desktop computing systems.

The computing device includes a display 204. The display 204 can include a graphical user interface and/or a liquid crystal display. The display 204 can include a touchscreen. A touchscreen refers to an input and/or output device layered on top of an electronic visual display (e.g., monitor) of a computing device to receive a touch input. The touchscreen can facilitate a user to interact directly with what is displayed (e.g., icons on a graphical user interface (GUI) displayed by the computing device, a virtual keyboard, GUI components of instructions executing on the computing device, pictures, videos, etc.).

The computing device 200 can include a camera module 210. As used herein, a camera module refers to a device that includes a camera 222. The camera 222 refers to a device that can capture a visual image such as a video. The camera can include a sensor and/or additional circuitry to capture a visual image. Examples of suitable types of cameras include a standard (width) camera, an ultra-wide camera, a telephoto camera, a macro camera, an infrared camera, and a monochrome camera, among other types of cameras.

The camera module 210 can include a microphone 212 and the camera 222. The microphone 212 refers to a device that can convert sound waves into electrical energy which can, for instance, be amplified, transmitted, and/or recorded. Examples of microphones include directional microphones (i.e., unidirectional microphones) and omnidirectional microphones. Examples of suitable microphones include micro-electro-mechanical systems (MEMS) microphones and Electret Condenser Microphones, among other types of microphones.

The camera module 210 can be formed of a body 223. The microphone 212, the camera 222, or both can be coupled to the body 223 of the camera module 210. The microphone 212 and the camera 222 can be separate and distinct components. For instance, the microphone 212 and the camera 222 can be coupled to the body 223 at different locations and/or can be coupled to the body in different manners.

The computing device 200 can include a housing 206. The housing 206 can form an exterior surface of the computing device 200. The housing 206 can be formed of fabric, metal, natural materials such as wood, and/or plastic, among other suitable materials. While illustrated as including a unitary housing 206, it is understood that the housing 206 can include a plurality of sections such as a plurality of sections held together by a hinge or other coupling member (e.g., in the instance of a laptop).

The housing 206 can include a plurality of surfaces including a bottom surface 208, a side surface such as the first side surface 209 and a second side surface 216, a front surface 214, a top surface 211, and a back surface (not illustrated). As used herein, the front surface refers a portion of the computing device that has a display such as panel/touchscreen/graphical user interface of the computing device, while the back surface refers to a portion of the computing device 200 that is opposite from the front surface.

As used herein, the bottom surface 208 refers to a portion of the computing device 200 that is proximate to a stand 202 and/or a base member on which the computing device 200 is resting, while the top surface 211 refers to a portion of the computing device 200 that is opposite the bottom surface. As used herein, a side surface refers to a surface located between the bottom surface 208 and the top surface 211 of the computing device 200. While illustrated as a rectangular housing, the housing 206 can come in various other shapes.

As illustrated in FIG. 2, the housing 206 can be coupled to the stand 202. The stand 202 refers to a physical device that extends from the housing 206 and/or a separate entity that can be coupled to the housing 206. The stand 202 can stabilize and/or elevate the display 204 above a surface on which the computing device 200 is disposed.

The stand 202 can include a wireless power circuitry 203 such as a wireless power transmitter circuit, as described herein. However, in some examples, the wireless power circuitry 203 or a portion of the wireless power circuitry 203 can be located elsewhere in the computing device 200. For instance, the wireless power transmitter circuit 205 can be located in elsewhere in the housing 206 of the computing device 200. In such examples, the wireless power circuitry 203 can be located in a bezel, display, keyboard deck, and/or another portion of the computing device 200.

While FIG. 2 illustrates the presence of the stand 202, in some examples the computing device 200 can be without a stand. For instance, the computing device 200 can be freestanding device (e.g., a laptop) or other type of device without a stand.

Figure 3:
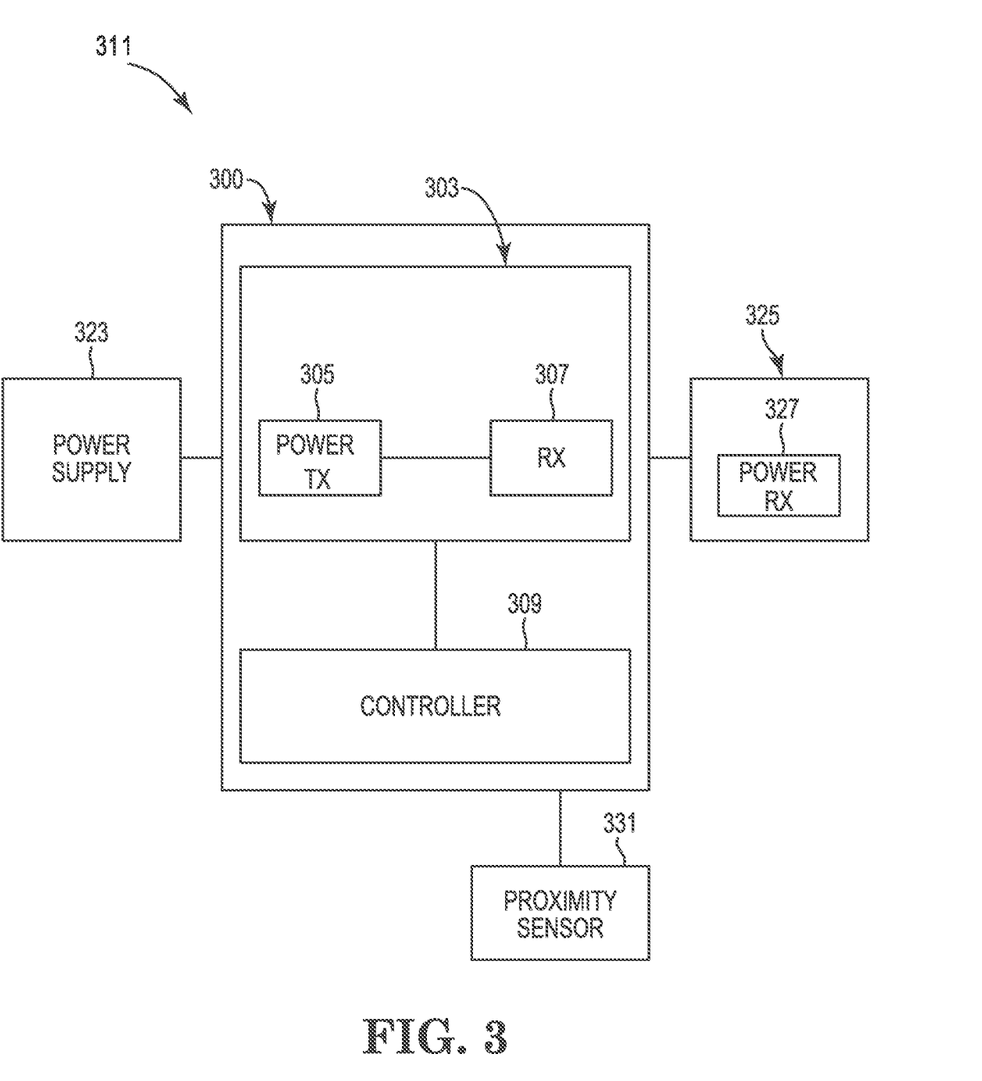
FIG. 3 is an example of a system including an example of a computing device suitable for wireless polling frequency alteration.

FIG. 3 is an example of a system 311 including an example of a computing device 300 suitable for wireless polling frequency alteration. The system 311 can include a computing device 300, a power supply 323, and a mobile device 325.

As described herein, the computing device 300 can include a controller 309 and a wireless power circuitry 303 including a wireless power transmitter circuit 305 that can wirelessly transmit power to the mobile device 325 and a wireless receiver circuit 307 (RX). As used herein the wireless receiver circuit 307 refers to circuitry capable of receipt of wireless signaling from another device such as the mobile device 325. For instance, wireless receiver circuit 307 can receive a response from the mobile device 325 to a ping emitted by the wireless power transmitter circuit 305. For example, the wireless receiver circuit 307 can include circuitry to receive a signal encoded using Amplitude Shift Key (ASK) modulation from the mobile device 325 responsive to a ping emitted by the wireless power transmitter circuit 305, among other possibilities.

The computing device 300 can include or be coupled to a proximity sensor 331. As used herein a proximity sensor refers to circuitry that can detect the presence of an object (e.g., a user and/or a mobile device) that is proximate to or in contact with the computing device 300. Examples of suitable proximity sensors include cameras, time of flight sensors, inductive proximity sensors, conductive proximity sensors, photoelectric proximity sensors, ultrasonic proximity sensors, among other types of proximity sensors. While the proximity sensor 331 is illustrated as being separate from and coupled to the computing device 300 in FIG. 3, in some examples the proximity sensor 331 can be included in a housing of the computing device 300.

The proximity sensor 331 can detect whether an object such as the mobile device 325 is proximate to the computing device 300. As used herein, a mobile device such as the mobile device 325 refers to a laptops, tablets, smartphones, wearable electronic devices or other types of mobile devices that can receive wireless power to recharge a rechargeable battery of the mobile device. For instance, the mobile device 325 can include a wireless power receiver circuitry 327 to receive a wireless ping and/or receive wireless power (e.g., wireless power transmitted by the wireless power transmitter circuit 305 of the computing device 300). The mobile device 325 can include various other circuitry such as wireless transmitter circuitry (not illustrated) that can transmit a response to a ping emitted by the computing device 300 and is received by the wireless power receiver circuitry 327 or otherwise received by the mobile device 325.

As mentioned, a wireless polling frequency can be altered based on a system state (e.g., an off state) of an apparatus such as the computing device 300, a type of supplied power to the apparatus, detection of an object, or any combination thereof, as described herein. In some examples, a wireless polling frequency can be altered based on detection, via the proximity sensor 331, of an object proximate to the computing device 300.

For instance, the controller 309 can alter the wireless polling frequency based on detection, via a proximity sensor 331, of an object proximate to the computing device 300. In some examples, the controller 309 can alter a wireless polling frequency to a first wireless polling frequency responsive to the detection of an object such as a user and/or the mobile device 325. The first wireless polling frequency can be less frequent than a uniform system wireless polling frequency as may be employed by other approaches. Alteration to the first wireless polling frequency can reduce a rate of energy dissipation of a battery in the computing device 300 and/or permit the computing device 300 to provide wireless charging in a given off state such as a S4 and S5 off state.

The controller 309 can alter the wireless polling frequency to a second wireless polling frequency responsive to the detection of an absence of an object (e.g., a user and/or a mobile device) proximate to the computing device 300. Notably, the second wireless polling frequency can be less frequent than the first wireless polling frequency. As such, a further reduction (relative to a rate of power dissipation during operation at the first wireless polling frequency) of a rate of energy dissipation of a battery of the computing device 300 can be realized when the likelihood of providing wireless power to a mobile device is reduced/not present).

As mentioned, in some examples wireless polling frequency can be altered based on a respective off state of the computing device 300. A respective off state of the computing device 300 can correspond to a particular Advanced Configuration and Power Interface (ACPI) specification power state. For example, if the computing device 300 is in S4/S5 off state then the wireless polling frequency of a ping can be lower relative to when the computing device 300 is in a higher (e.g., S0, S1, S2, S3, or modem standby) system state. The reduction in wireless polling frequency can reduce an amount of power dissipated from a battery and/or permit the computing device 300 to provide wireless charging in a given system state (e.g., in both a S4 and S5 off state). Additionally, if a proximity sensor indicates an object is absent, a frequency of the pings can be further reduced/ceased. Thus, any power dissipation from a battery of the computing device 300 can be further reduced when in a given (e.g., S5 off state) system state.

The power supply 323 refers to a source of electrical power. The power supply 323 can be included in or coupled to the computing device 300. The power supply 323 can be a direct current (DC)/DC power supply or an alternating current (AC)/DC power supply. In some examples, the power supply 323 can be a battery included in the computing device 300 to provide D/C to the computing device 300, among other possibilities.

Figure 4:
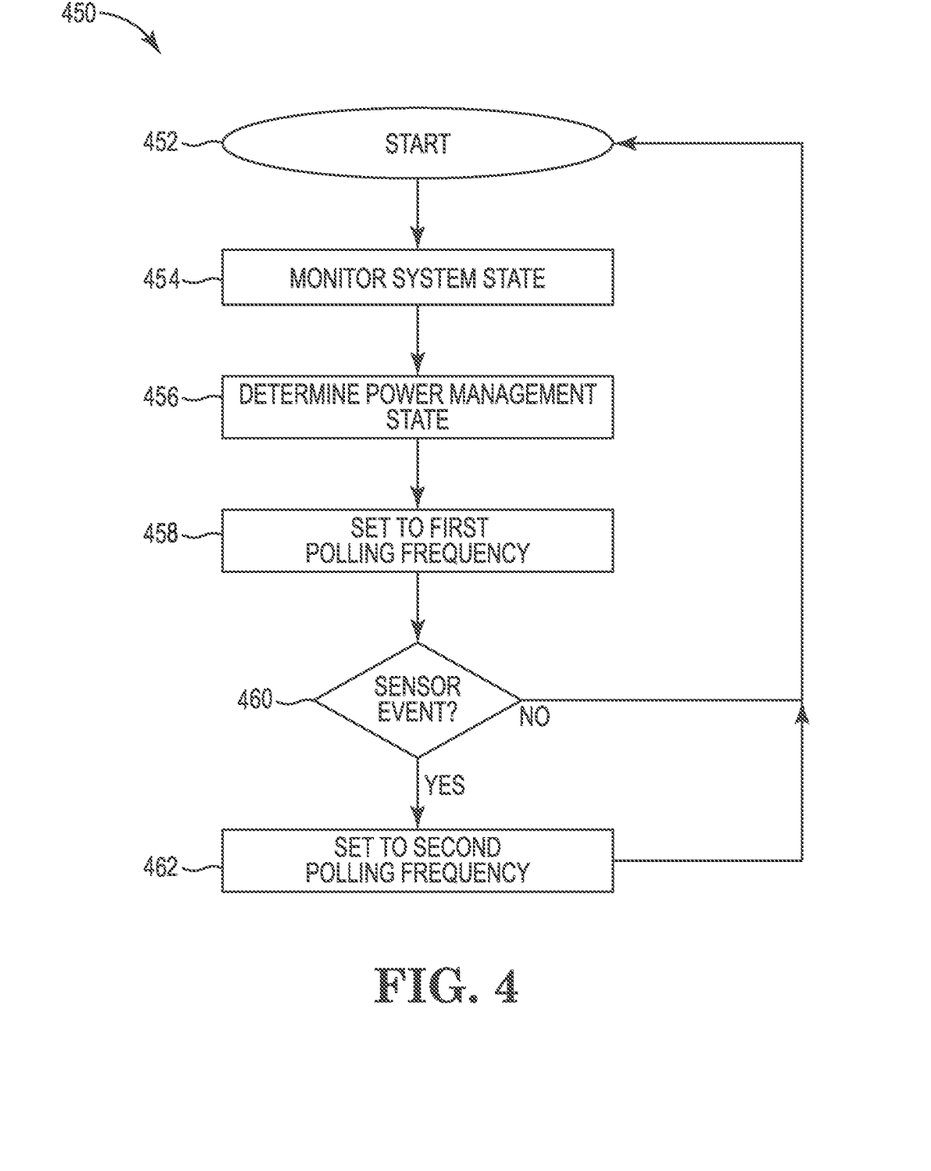
FIG. 4 is a flow diagram of an example of wireless polling frequency alteration.

FIG. 4 is a flow diagram 450 of an example of wireless polling frequency alteration. At 452, the flow can start. The flow can start responsive to a change in a system state, as detailed herein, responsive to an input (e.g., an input to a computing device), and/or can start periodically, among other possibilities. Once started, the flow can proceed to 454.

At 454 a system state can be monitored. Examples of system states include on/off states of an apparatus such as a computing device, a type of supplied power to the apparatus, and/or whether an object is proximate to the apparatus. A flag, a state of a status register, a current setting of a computing device, and/or information from a sensor such as a proximity sensor can be determined to monitor a given system state. Monitoring the system state can promote various aspects herein such as alteration of a wireless polling frequency based on a current system state.

At 456, a power management state can be determined. As used herein a power management state refers to a particular setting or other configuration of a computing device that controls operation of the computing device such as a particular wireless polling frequency of the computing device. Examples of power management states include a disabled state, a deep sleep state, a reduced mode, an active mode. However, having fewer or a greater quantity of power management states is possible.

The power management state can be determined based on a monitored system state. For instance, a power management state can be determined via a look-up table or other data structure which includes various system management states and corresponding power management states. For example, in Tables 1 and 2 a given power management state can be determined based on a current (e.g., real time) on/off state and type of power supplied to a computing device. While not illustrated in Tables 1 and 2, a power management state can be further determined based on whether or not an object is proximate to the computing device.

At 458, a wireless polling frequency can be altered to a respective wireless polling frequency of a plurality of polling frequencies. For instance, the wireless polling frequency can be altered to a first wireless polling frequency based on an on/off state of the computing device, a type of supplied power to the computing device, detection of an object proximate to the computing device, or any combination thereof. In some examples, the wireless polling frequency can be altered (e.g., from a system wireless polling frequency) to a first wireless polling frequency that corresponds (e.g., in look-up table or other data structure) to a current determined power management state of a computing device.

At 460, the presence or absence of an object proximate to the computing device can be determined. As mentioned, a proximity sensor can determine whether or not an object (e.g., user of the computing device and/or a mobile device) is proximate to or in contact with the computing device.

Responsive to a determination that an object is absent (e.g., not proximate to the computing device) (YES) the flow can proceed to 462. At 462 the wireless polling frequency can be altered. For instance, responsive to sensor event (a determination that an object is absent) the wireless polling frequency can be further reduced (e.g., from the first wireless polling to the second wireless polling frequency). Such alteration can provide a further reduction in a rate of energy (e.g., battery) power dissipated from the computing device.

Conversely, responsive to a determination that an object is present (e.g., an object is proximate to the computing device) (NO) the return to 452 and be started again.

Figure 5:
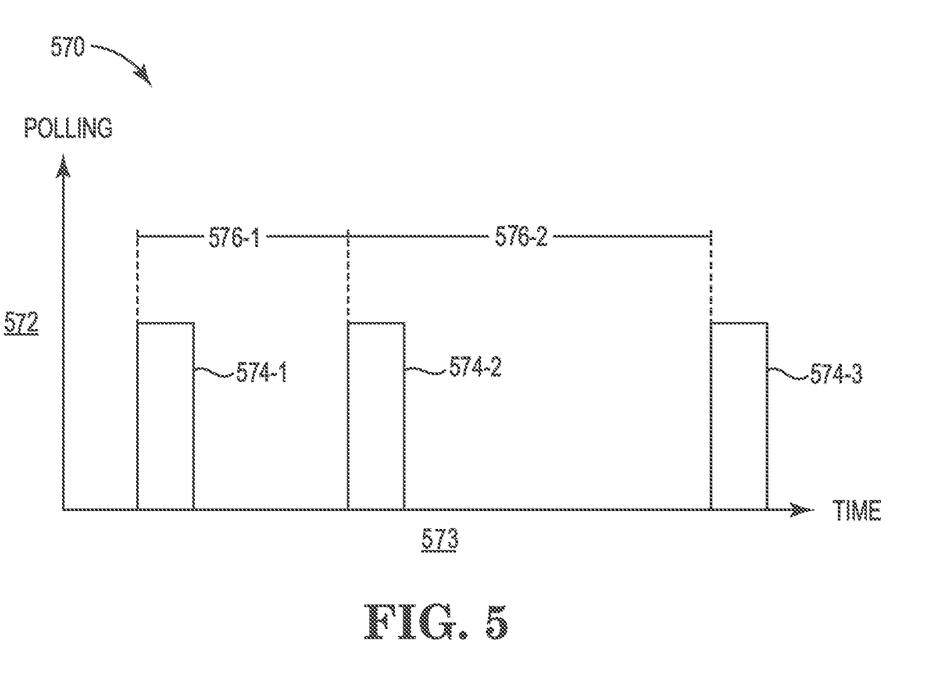
FIG. 5 is a diagram of an example of wireless polling frequency alteration.

FIG. 5 is a diagram 570 of an example of wireless polling frequency alteration. The diagram includes a first axis 572 and a second axis 573. The first axis 572 can correspond to a polling frequency or emission of a wireless ping. The second axis 573 can correspond to an elapse of time. Thus, the diagram 560 can illustrate a frequency of wireless polling (e.g., a frequency of emission of a wireless pings).

For example, a first wireless ping 574-1 can be emitted at a first time, a second wireless ping 574-2 can be emitted at a second time (subsequent to the first time), and a third wireless ping 574-3 can be emitted at a third time (subsequent to the second time). Notably, a frequency of such wireless polling can be altered. For instance, a first time interval 576-1 between emission (e.g., initiation) of the first wireless ping 574-1 and emission of the second wireless ping 574-2 can be different than a second time interval 576-2 between the emission of the second wireless ping 574-2 and emission of the third wireless ping 574-3. For example, as illustrated in FIG. 5 the second time interval 576-2 can be longer than the first time interval 576-1. Stated differently, the wireless polling frequency can be less frequent. As such, unlike other approaches that employ a uniform wireless polling interval and/or cease wireless polling (pinging) in a given off state (e.g., a S4 and/or S5 off state), approaches herein can permit some degree of wireless polling and thus permit wireless charging even in S4 or S5 off state.

The figures herein follow a numbering convention in which the first digit corresponds to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2.

Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

The above specification and examples provide a description of the method and applications and use of the system and method of the present disclosure. Since many examples can be made without departing from the scope of the system and method, this specification merely sets forth some of the many possible example configurations and implementations.

What is claimed is:
1. A computing device comprising:
   a wireless power transmitter circuit to emit wireless signals to detect a presence of a wireless receiver circuit in a mobile device; and
   a controller to alter a wireless polling frequency at which the wireless power transmitter circuit emits the wireless signals to a respective wireless polling frequency of a plurality of wireless polling frequencies, wherein the wireless polling frequency indicates a time period between transmissions of respective wireless signals of the wireless signals, wherein to alter the wireless polling frequency, the controller is to alter the wireless polling frequency from a first wireless polling frequency to a second wireless polling frequency, wherein a first time interval between a first two sequential wireless signals of the wireless signals corresponds to the first wireless polling frequency, wherein a second time interval between a second two sequential wireless signals of the wireless signals corresponds to the second wireless polling frequency, and wherein the first time interval is different from the second time interval.

2. The computing device of claim 1, wherein the wireless signals are passive wireless pings.

3. The computing device of claim 1, wherein the wireless signals are active wireless pings.

4. The computing device of claim 1, wherein the controller is further to alter the wireless polling frequency based on a power management state of the computing device.

5. The computing device of claim 1, wherein the first wireless polling frequency is less frequent than a system wireless polling frequency.

6. The computing device of claim 1, wherein the controller is to alter the wireless polling frequency based on detection, via a proximity sensor, of an object proximate to the computing device.

7. The computing device of claim 6, wherein the controller is to alter the wireless polling frequency to emit the wireless signals:

at h first wireless polling frequency responsive to detection of the object; and at the second wireless polling frequency that is less frequent than the first wireless polling frequency responsive to the detection of an absence of the object.

8. An apparatus comprising:

a wireless power transmitter circuit to emit wireless signals to detect a presence of a wireless power receiver circuit; and a controller to alter a wireless polling frequency at which the wireless power transmitter circuit emits the wireless signals to a respective wireless polling frequency of a plurality of polling frequencies based on a power management state of the apparatus, a type of supplied power to the apparatus, detection of an object, or any combination thereof, wherein to alter the wireless polling frequency, the controller is to alter the wireless polling frequency from a first wireless polling frequency to a second wireless polling frequency, wherein a first time interval between a first two sequential wireless signals of the wireless signals corresponds to the first wireless polling frequency, wherein a second time interval between a second two sequential wireless signals of the wireless signals corresponds to the second wireless polling frequency, and wherein the first time interval is different from the second time interval.

9. The apparatus of claim 8, wherein each wireless polling frequency of the plurality of polling frequencies is a different respective wireless polling frequency.

10. The apparatus of claim 8, wherein the controller is further to alter the wireless polling frequency based on whether the apparatus is supplied with alternating current (A/C) or direct current (D/C).

11. The apparatus of claim 10, wherein the controller is to detect the power management state of the apparatus, and wherein the controller is to alter the wireless polling frequency during the power management state by:

increasing a wireless polling frequency when the apparatus is supplied with A/C; and decreasing a wireless polling frequency when the apparatus is supplied with D/C.

12. An all-in-one (AIO) computing device comprising:

a display with a housing;

a stand coupled to the display;

a wireless power transmitter circuit to emit wireless signals to detect a presence of a wireless power receiver circuit in a mobile device that is separate from the AIO computing device; and a controller to alter a wireless polling frequency at which the wireless power transmitter circuit emits the wireless signals to a respective wireless polling frequency of a plurality of polling frequencies, wherein to alter the wireless polling frequency, the controller is to alter the wireless polling frequency from a first wireless polling frequency to a second wireless polling frequency, wherein a first time interval between a first two sequential wireless signals of the wireless signals corresponds to the first wireless polling frequency, wherein a second time interval between a second two sequential wireless signals of the wireless signals corresponds to the second wireless polling frequency, and wherein the first time interval is different from the second time interval.

13. The AIO computing device of claim 12, wherein the controller is to alter the wireless polling frequency to the first wireless polling frequency of the plurality of polling frequencies when the AIO computing device is in an on state or a modern standby state.

14. The AIO computing device of claim 13, wherein the controller is to alter the wireless polling frequency to a second wireless polling frequency of the plurality of polling frequencies when the AIO computing device is in at least one selected from a sleep mode state, a deep sleep mode state, or a reduced mode state.

15. The AIO computing device of claim 14, wherein the second wireless polling frequency is to emit the wireless signals less frequently than the wireless signals emitted at the first wireless polling frequency.

* * * * *